United States Patent [19]

Padmanabhan et al.

[11] Patent Number: 5,799,080
[45] Date of Patent: Aug. 25, 1998

[54] SEMICONDUCTOR CHIP HAVING IDENTIFICATION/ENCRYPTION CODE

[75] Inventors: Gobi R. Padmanabhan, Sunnyvale; Joseph M. Zelayeta, Saratoga; Visvamohan Yegnashankaran, Redwood City; James W. Hively, Sunnyvale; John P. Daane, Saratoga, all of Calif.

[73] Assignee: LSI Logic Corporation, Milpitas, Calif.

[21] Appl. No.: 502,300

[22] Filed: Jul. 13, 1995

[51] Int. Cl.⁶ ......................................................... H04L 9/00
[52] U.S. Cl. ............................. 380/4; 380/21; 365/103
[58] Field of Search .................... 380/4, 21; 365/103; 257/550; 377/54

[56] References Cited

U.S. PATENT DOCUMENTS

| | | | |
|---|---|---|---|
| 4,404,654 | 9/1983 | Kamuro et al. | 365/103 |
| 5,119,163 | 6/1992 | Ishihara et al. | 357/51 |
| 5,467,396 | 11/1995 | Schossow et al. | 380/4 |

*Primary Examiner*—Thomas H. Tarcza
*Assistant Examiner*—Carmen D. White
*Attorney, Agent, or Firm*—Townsend and Townsend and Crew LLP; Henry K. Woodward

[57] ABSTRACT

A code mechanism is provided in an integrated circuit for identifying the integrated circuit such as by serial number or for use in enabling the circuit and equipment housing the circuit. Fuses, antifuses, and programmable field effect transistors are used in an array for establishing a code. The code can be established by loading a register through the array and then reading the register. Alternatively, the contents of the register can be compared with a code provided by a user to enable the circuit. In another embodiment, a ROM is loaded with a table of encryption keys, and a user addresses the ROM by loading an address in a register or in a RAM.

11 Claims, 3 Drawing Sheets

5,799,080

SEMICONDUCTOR CHIP HAVING IDENTIFICATION/ENCRYPTION CODE

BACKGROUND OF THE INVENTION

This invention relates generally to semiconductor devices such as integrated circuits, and more particularly the invention relates to coding of semiconductor devices for identification and for security in using the devices.

There is increasing need for identifying particular equipment which could access a central database for information. The identification should be hard encoded within a chip inside the equipment so that unscrambling through software is not readily available. Use of a unique identifier could be used to monitor and prevent theft of integrated circuits.

The present invention is directed to providing a suitable code mechanism embedded in a semiconductor chip which can be permanently encoded or can be reprogrammed periodically.

SUMMARY OF THE INVENTION

In accordance with the invention a code mechanism is provided in an integrated circuit for identifying the integrated circuit such as by serial number or for use in enabling the circuit and equipment housing the circuit. The code is readily accessible for interrogation and for circuit enablement.

In one embodiment of the invention, fuses and antifuses are used to establish a permanent code in a circuit for identification. The code is readily addressed such as by selectively loading a shift register through the fuses or antifuses and then reading out the stored code.

Alternatively, a code can be established in a first register, and a matching code is loaded into a second register. Contents of the two registers are compared to activate the circuit. The programmed register can be readily reprogrammed by use of an electrically erasable field effect transistor such as used in EEPROM memories.

In another embodiment, a table of encryption keys can be programmed into a ROM in a semiconductor device. A register or RAM is then programmed with a ROM address to one of the keys contained in the ROM. The encryption key contained in the ROM address is then used by decryption logic in the integrated circuit. The address in the RAM or register can be changed by writing a new address to the register from either a key panel outside of the circuit or through downloading a new address from a transmission medium. This enables the encryption key to be regularly altered to avoid pirating. RAM and ROM structures can easily be built in ASIC gate arrays and cell based logic processes and do not require the extra processing steps required for fuse, antifuse, or EEPROM technology.

The invention and objects and features thereof will be more readily apparent from the following detailed description and appended claims when taken with the drawing.

DETAILED DESCRIPTION OF ILLUSTRATIVE EMBODIMENTS

Figure 1:
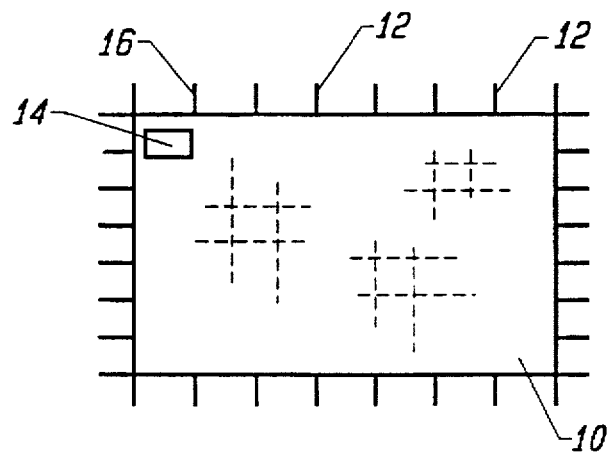
FIG. 1 is a plan view of a semiconductor chip including a code mechanism in accordance with the invention.

FIG. 1 is a plan view of an integrated circuit 10 having a plurality of leads 12 extending from contacts on the periphery thereof. A code mechanism 14 in accordance with the invention is provided in a peripheral portion of the chip 10 and is accessible by leads 16. The code mechanism is addressable from outside of the chip for identification of the chip and for enabling operation of the chip.

Figure 2:
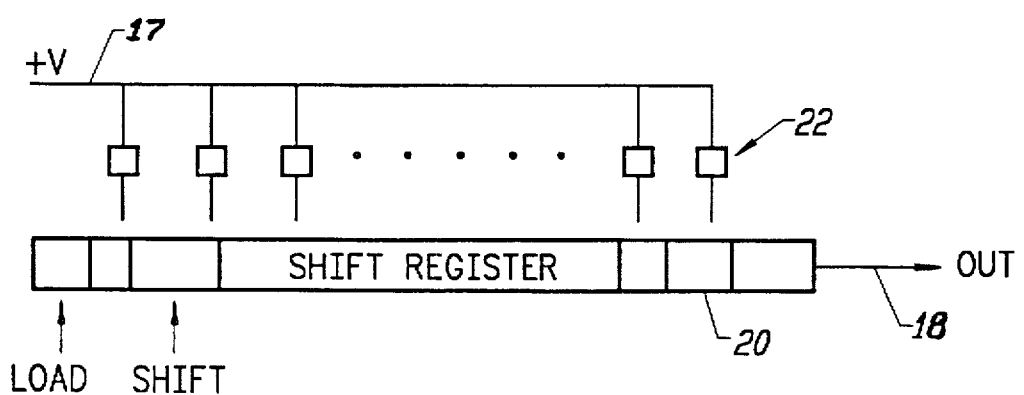
FIG. 2 is a functional block diagram of a code mechanism in accordance with one embodiment of the invention.

FIG. 2 is a functional block diagram of one embodiment of the code mechanism 14 in FIG. 1 in accordance with one embodiment of the invention. In this embodiment, a shift register 20 can be periodically loaded through an array 22 of fuses or antifuses by applying a voltage potential to the lead 17. After the shift register 20 is loaded, the register is read out on line 18 to identify a code established by the array 22 of fuses or antifuses. The array 22 can establish a binary code, for example 32 fuses will establish $2^{32}$ possible serial numbers for the integrated circuit. Thus, the serial number of the integrated circuit as established by the array 22 of fuses or antifuses is readily accessed through the leads 17 and 18. The leads 17 and 18 can also function as input and output leads for the integrated circuit 10 during normal circuit operation.

Figure 3:
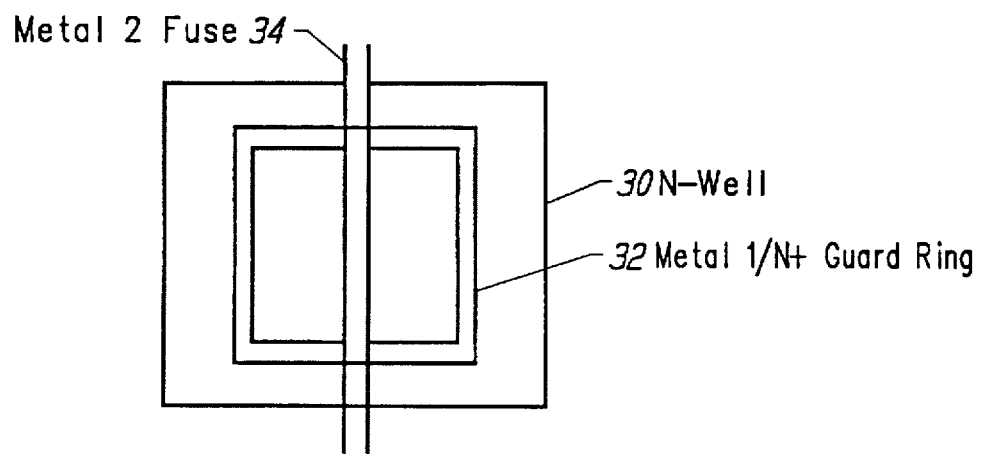
FIG. 3 is a plan view of a fuse which can be used in the code mechanism of FIG. 2.

FIG. 3 is a plan view of a conventional fuse as employed in programming integrated circuits. In this embodiment an N-well 30 is first established in the surface of the integrated circuit to provide isolation from the active regions of the circuit. A metal 1 ring is formed over an N+ guard ring to offer further electrical isolation. A metal 2 fuse line 34 passes over the metal 1/N+ guard ring 32 and is normally conductive. However, the fuse is readily blown during circuit fabrication by applying a laser beam to the aluminum fuse line 34 within the guard ring 32 to ablate the line and open the connection provided by the fuse line.

Figure 4:
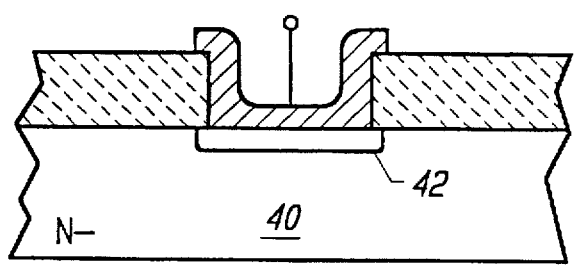
FIG. 4 is a section view of an antifuse which can be used in the code mechanism of FIG. 2.

The use of antifuses is also well known in the semiconductor field. FIG. 4 is a section view of an antifuse as disclosed in U.S. Pat. No. 4,590,589 which is normally nonconductive until a sufficient voltage is applied across the antifuse to lower the resistance thereof and become conductive. As described in the '589 patent, the antifuse can comprise a portion of an N-silicon substrate 40 with an implanted region 42 formed in a surface region by the introduction of P-type ions. The implanted ions disrupt the crystalline structure of the substrate 40, referred to as amorphotizing, and the disrupted crystalline structure increases the resistance between region 42 and the substrate 40. However, by applying a sufficient voltage across the implanted region 40, the crystalline state of the region is reinstated and the resistance thereof drops appreciably.

Figure 5:
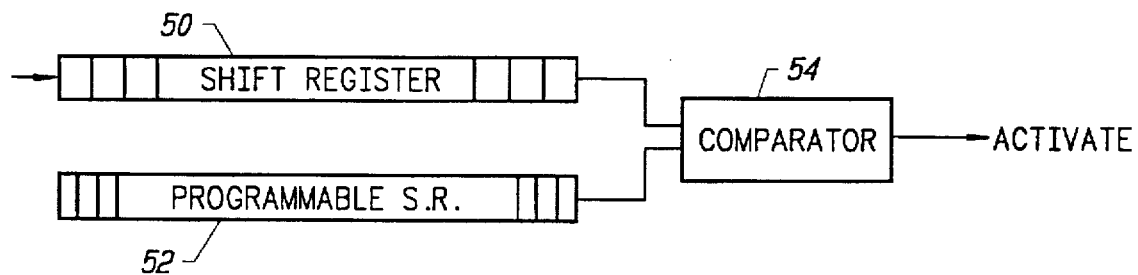
FIG. 5 is a functional block diagram of a code mechanism in accordance with an other embodiment of the invention.

FIG. 5 is a functional block diagram of another embodiment of the code mechanism in accordance with the invention which can be used to selectively enable the integrated circuit by loading a code word into shift register 50. A programmable shift register 52, similar to the shift register of FIG. 2 for example, is used to store the code, and a comparator 54 receives and compares the programmed code with the code from shift register 50. When the codes match, comparator 54 provides a signal to activate the circuit. When the codes do not match, the circuit is disabled. Thus, the integrated circuit can limit the access to secured information unless a prescribed code is used to activate the circuit.

Figure 6:
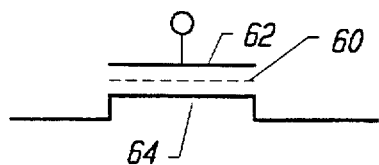
FIG. 6 is a functional block diagram of an electrically erasable field effect transistor which can be used in the code mechanism of FIG. 5.

Rather than using a permanently programmed shift register 52 through use of fuses and antifuses, as described above with reference to FIGS. 2–4, an electrically erasable field effect transistor as shown in FIG. 6 can be used to selectively load the programmable shift register 52. As used in electrically erasable programmable read only memories (EEPROMs), the field effect transistor of FIG. 6 can be rendered conductive or nonconductive by the selective introduction of charge on a floating gate 60 between the control gate 62 and the channel region 64 of the transistor. The charge on the floating gate is typically applied by hot electron injection from either the source or drain into the floating gate by selective biasing of the transistor elements. Erasure of the floating gate occurs by electron tunneling from the floating gate to a suitably biased drain region. A thin tunneling oxide is typically provided under the floating gate 60 near the drain region.

Figure 7:
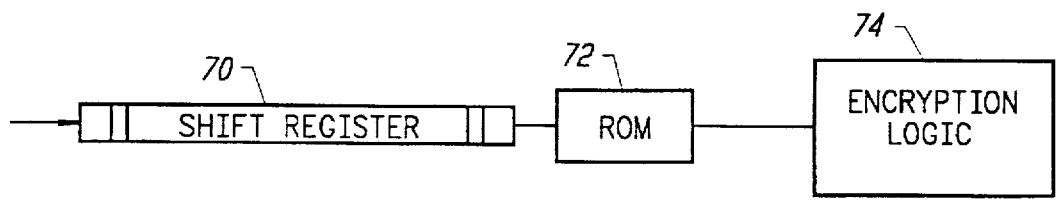
FIG. 7 is a functional block diagram of another embodiment of a code mechanism in accordance with the mechanism.

FIG. 7 is a functional block diagram of another embodiment of a code mechanism in accordance with the invention. In this embodiment, a shift register (or RAM) 70 is again loaded and then used to address a ROM 72 which houses a table of encryption keys. The address of a suitable encryption key is required so that the key from ROM 72 can be applied to encryption logic 74 for activating the integrated circuit. The address in the RAM or register can be changed by writing a new address to the register from either a key panel on the outside of the chip or through downloading a new address from a transmission medium. This enables the encryption key to be regularly altered to avoid pirating. RAM and ROM structures can be easily built in ASIC gate arrays and cell based logic processes and do not require the extra processing step required for fuse, antifuse, or EEPROM technology. Thus, the cost of this embodiment is lower.

There has been described several embodiments of a code mechanism for use in semiconductor chips. While the description has been described with reference to specific embodiments, the description is illustrative of the invention and is not to be construed as limiting the invention. Various modifications and applications may occur to those skilled in the art without departing from the true spirit and scope of the invention as defined by the appended claims.

What is claimed is:

1. A semiconductor integrated circuit comprising a semiconductor body having active and passive elements formed therein including a plurality of contacts on peripheral portions of said body, and a code mechanism provided in a portion of said body and accessible through at least one of said contacts said code mechanism including an array of elements which can individually be altered in electrical conductance to define a code, a first shift register into which a code can be loaded through said array of elements, and a second shift register having an input for receiving a code from a source external to said integrated circuit, a comparator, a means connecting an output of said first shift register and an output of said second shift register to said comparator, said comparator controlling operation of said integrated circuit in response to comparing said output of said first shift register and said output of said second shift register.

2. The semiconductor integrated circuit as defined by claim 1 wherein said array of elements comprises fuses.

3. The semiconductor integrated circuit as defined by claim 1 wherein said array of elements comprises antifuses.

4. The semiconductor integrated circuit as defined by claim 1 wherein said array of elements comprises programmable field effect transistors.

5. The semiconductor integrated circuit as defined by claim 1 wherein said array of elements is connected to a contact for receiving a voltage.

6. The semiconductor integrated circuit as defined by claim 5 and further including means connecting an output of said shift register to another contact for accessing contents of said shift register.

7. A code mechanism for use in a semiconductor device formed in a semiconductor body comprising an array of elements which can be individually altered in electrical conductance to define a code, a first register means for loading data in said register through said array of elements, a second shift register having an input for receiving a code from a source external to said integrated circuit, a comparator, a means connecting an output of said first shift register and an output of said second shift register to said comparator, said comparator controlling operation of said integrated circuit in response to comparing said output of said first shift register and said output of said second shift register.

8. The code mechanism as defined by claim 7 wherein said array of elements comprises fuses.

9. The code mechanism as defined by claim 7 wherein said array of elements comprises antifuses.

10. The code mechanism as defined by claim 7 wherein said array of elements comprises programmable field effect transistors.

11. The code mechanism as defined by claim 7 further including a contact connected to said elements for applying a voltage to said elements.

\* \* \* \* \*